March 23, 1937. E. MARX 2,074,930
CURRENT CONVERTING SYSTEM
Filed March 17, 1934    3 Sheets-Sheet 1

Inventor:
Erwin Marx
by Naruhichatri
Atty.

March 23, 1937.  E. MARX  2,074,930

CURRENT CONVERTING SYSTEM

Filed March 17, 1934  3 Sheets-Sheet 2

Inventor:
Erwin Marx
by Karl Michaelis
Atty.

March 23, 1937.                    E. MARX                    2,074,930
                          CURRENT CONVERTING SYSTEM
                       Filed March 17, 1934         3 Sheets-Sheet 3

Inventor:
Erwin Marx
by Karl Michaelis
Atty.

Patented Mar. 23, 1937

2,074,930

UNITED STATES PATENT OFFICE 2,074,930

CURRENT CONVERTING SYSTEM

Erwin Marx, Brunswick, Germany

Application March 17, 1934, Serial No. 716,083
In Germany March 21, 1933

34 Claims. (Cl. 175—363)

My invention relates to systems for converting direct, alternating and polyphase currents into each other and more especially to a system of the kind in which an arc is periodically ignited and extinguished between a couple of electrodes and a continuous flow of gas, for instance air, maintained within the gap between the electrodes. Converting systems of this kind are described for instance in my book entitled "Lichtbogenstromrichter", published in Berlin in 1932.

It is an object of my invention to improve the ignition of the arcs between the electrodes (referred to hereinafter as main electrodes) of converting systems of the kind referred to.

In order to ignite an arc between the electrodes of converting systems of other kinds it has been proposed to apply to the electrodes a very high potential considerably exceeding the normal operating voltage, for instance a high frequency or shock-like potential, which causes a flash-over between the electrodes. Provided that the energy of the igniting spark is sufficiently large, the dielectric in the path of the flash-over is heated, so that the normal operating current can flow between the electrodes. This method of igniting an arc between the electrodes involves considerable drawbacks. As a rule the potential for initiating the flash-over amounts to the threefold of the peak value of the operating voltage. Further the energy of the flash-over must be very high. After the igniting of the arc the normal operating current partly flows through the circuit delivering the flash-over voltage. In consequence thereof the dimensions of the igniting devices are very large and the costs for manufacturing them very high. Large-sized condensers must be provided for separating from the other apparatus and connections of the plant the high potentials and energies for initiating and maintaining the flash-over.

It has further been proposed to initiate arcs between electrodes by means of auxiliary glow electrodes provided with sharp edges glowing at a low auxiliary voltage. In operation auxiliary glow electrodes of this kind cause a preionization between the main electrodes and reduce the time retardation of the discharge between the main electrodes. By means of auxiliary glow electrodes, however, the flash-over voltage between the main electrodes cannot be reduced below the value corresponding to the electric strength of the gap between the main electrodes during continuous operation, so that the arcs between the main electrodes will be ignited only after the instantaneous value of the voltage has reached a predetermined value. In consequence thereof the ignition of arcs by means of auxiliary glow electrodes cannot be used in converting systems and more particularly in polyphase converting systems, of the kind referred to above, because there the arcs between the electrodes of the valves of the single phases should already be initiated when the instantaneous value of the operating voltage is very low.

It is an object of my invention to provide a converting system of the kind referred to, in which the arcs between the main electrodes are easily ignited at low instantaneous values of the operating voltage. In order to accomplish this, I provide one or more auxiliary electrodes arranged, so that spark-overs or auxiliary arcs are initiated between an auxiliary electrode and its associated main electrode, whereby the arc is ignited between the main electrodes at a low instantaneous value of the operating voltage.

Other objects of my invention will appear as the specification proceeds.

In the drawings affixed to this specification and forming part thereof some embodiments of my invention are illustrated diagrammatically by way of example.

In all figures the means for producing the flow of gas in the gap between the main electrodes have been omitted for the sake of simplicity.

Figure 1:
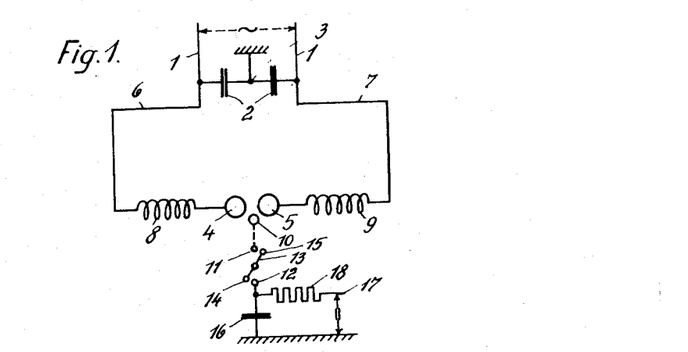
Fig. 1 is a wiring diagram serving to explain the principle underlying an igniting device according to my invention.

Referring first to Fig. 1, I are the terminals of an alternating current supply, 2 are condensers connected with each other in series and in shunt to the terminals I, the connecting point 3 of the condensers being connected to ground. 4 and 5 are a pair of ball-shaped main electrodes arranged opposite each other and connected to the terminals I by means of connections 6 and 7 and choke coils 8 and 9, respectively. 10 is a ball-shaped auxiliary electrode arranged in proximity of the main electrodes 4 and 5 and connected to the stationary contact 11 of a rotary spark gap comprising a stationary contact 12 and a rotating member 13 provided with contacts 14 and 15. 16 is a condenser connecting the stationary contact 12 to ground. 17 is a terminal of a direct current supply, the other terminal of which is connected to ground. 18 is a resistance connecting terminal 17 to the stationary contact 12 of the rotary spark gap.

The operation of this device is as follows:

The condenser 16 is loaded over the resistance 18 by the D. C. current supply. The rotating member 13 of the spark gap is driven in synchronism with the frequency of the alternating current supply. In consequence thereof the D. C. potential is periodically applied to the auxiliary electrode 10 at intervals having a predetermined relation of phase to the alternating current voltage applied to the main electrodes through the connections 6, 7 and the choke coils 8, 9. When the D. C. potential is applied to the auxiliary electrode 10, flash-overs are initiated between the auxiliary electrode 10 and the main electrodes 4 and 5, whereby an arc between the main electrodes is initiated. The initiation of the main arc between the main electrodes may be facilitated, as described hereinafter, by driving the auxiliary arc established between the auxiliary electrode and one of the main electrodes towards the other main electrode by means of an air current or a magnetic blow, whereby the foot point of the auxiliary arc is transferred from the auxiliary electrode to the other main electrode. The ignition of the arc is facilitated by the choke coils 8, 9 forming oscillating circuits amplifying the igniting energy. The igniting voltage is shielded from the alternating current line by means of the condensers 2. In order to facilitate the discharging of these condensers, high ohmic resistances (not shown) may be connected to them in shunt. The main electrodes may be formed as converting electrodes of a well known kind.

If desired the auxiliary voltage may be applied to the auxiliary electrode 10 in a manner different from that shown in Fig. 1, for instance by means of a Tesla transformer or a combined shock and Tesla connection. In some cases the rotary spark gap may be replaced by a stationary one or may be omitted altogether. Since according to my invention no large igniting energies are required, a magnetic or a cell ignition such as used in connection with internal combustion engines may be provided. In plants comprising a plurality of valves ignition is preferably effected by means of a single igniting device in combination with a distributor.

Figure 2:
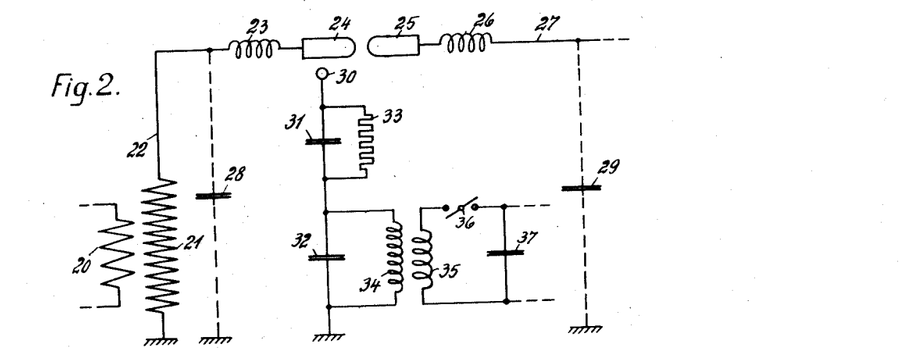
Figs. 2 and 3 are wiring diagrams of converting systems provided with one and two auxiliary electrodes, respectively.
Figure 3:
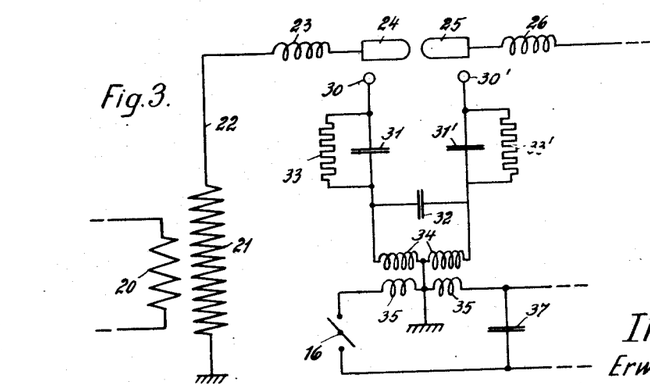

Particular difficulties are experienced in preventing the transition of the operating current to the igniting device and a grounding of the alternating current circuit. To this end I provide high resistances, capacities, spark gaps or valves inserted between the auxiliary electrode and ground, which prevent or reduce a current flow from the auxiliary electrodes to ground. Embodiments of these resistances etc. are illustrated in Figs. 2 and 3.

Preferably means are provided for diminishing the burning away of the auxiliary electrode by the auxiliary arc, so that the electrode need not be frequently replaced. In order to accomplish this, I provide, as described hereinafter, air currents or magnetic fields and I shape the auxiliary electrode in a suitable manner, so that the base point of the auxiliary arc remains only a very short time on the face of the auxiliary electrode. The air current may be guided in such manner that the auxiliary electrode is cooled at that part which is principally subjected to burning away. If desired, the air current may flow from the interior of the auxiliary electrode to the outside thereof. By suitably shaping the auxiliary electrode, provision may be made for initiating the auxiliary arc from various points of the auxiliary electrode. If the face of the auxiliary electrode is sufficiently large or if the electrode is shaped like a comb or ring, the base points of the arcs will change their positions very frequently, so that the electrode is not subjected to heavy burning away at a single point. The burning away may further be reduced by applying a cooling liquid or gas to the auxiliary electrode.

The ignition and more particularly the division of the igniting spark in the direction of the two main electrodes may be facilitated by imparting a steep rise to the igniting voltage. This may be accomplished by shortening the connections of the igniting circuit as soon as possible and by replacing the rotary spark gap shown in Fig. 1 by a sphere gap or a gap arranged in compressed air or oil. Means may further be provided for imparting to the igniting voltage a polarity which at the moment of ignition is opposite to the polarity of the main electrodes or of one of them. The voltage difference between the auxiliary electrode and the main electrodes will then be high and the ignition is effected at a lower absolute value of the igniting voltage.

In spite of the fact that the auxiliary electrode is arranged in proximity of the main electrodes, the blocking voltage between the main electrodes is not materially reduced, as I have found by tests, provided that the auxiliary electrode is suitably shaped and suitably spaced from the main electrodes and is sufficiently cooled. Besides this the potential of the auxiliary electrode may be controlled in such manner that during the blocking time the flash-over voltage between the main electrodes is as high as possible. This control of the potential of the auxiliary electrode may be effected by means of a high resistance or inductance or a combination of the two. In order to impart to the auxiliary electrode during the blocking time a potential which is the mid value of the potentials of the main electrodes, the auxiliary electrode may be connected to the main electrodes by high resistances of equal value (not shown).

Figure 8:
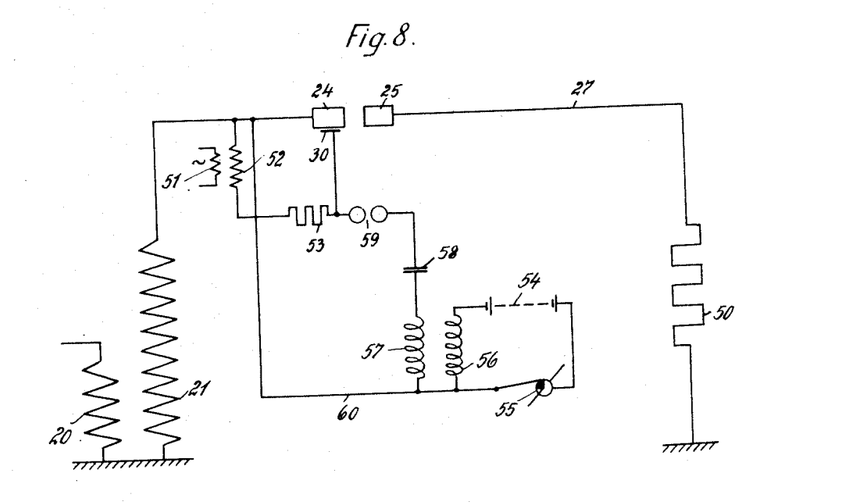
Fig. 8 is a wiring diagram of still another converting system according to this invention.

It should be understood that the connection shown in Fig. 1 may be used, if desired, as a valve element of a converting system in a similar manner as shown hereinafter in connection with Figs. 2, 3 and 8.

In the arrangement shown in Fig. 1 the auxiliary electrode 10 carries the base of an arc during a relatively large portion of the time of operation of the system and in consequence thereof it is subjected to relatively heavy burning away. Further in this arrangement the auxiliary electrode exerts a distorting influence on the electric field between the main electrodes and this may facilitate back ignition between the main electrodes during the blocking time. This will be particularly the case, if high voltages and large currents occur in the main circuit. In such cases I prefer using arrangements such as illustrated in Figs. 2 and 3, in which the auxiliary electrodes are spaced from the gap of the main arc. Both figures illustrate systems for single phase rectification of an alternating current, although a similar arrangement may be used in polyphase systems for converting direct current into alternating current or for converting the frequency of an alternating current.

Referring now to Fig. 2, 20 is the primary of a transformer connected to an alternating current supply (not shown). 21 is a secondary of this transformer, one terminal of which is connected to ground, the other terminal being connected to a main electrode 24 of a valve through a connection 22 and a choke 23. The other main electrode 25 of the valve is connected through a choke 26 and connection 27 to the terminal of a direct current line (not shown), the other pole of which is grounded. 28 and 29 are condensers connecting the connections 22 and 27 to ground, respectively. 30 is an auxiliary electrode connected to ground by means of two condensers 31 and 32 connected in series to each other. Condenser 31 is shunted by a high ohmic resistance 33, condenser 32 being shunted by the secondary 34 of a Tesla transformer, the primary 35 of which is connected to an alternating current supply (not shown) by means of a rotary spark gap 36. 37 is a condenser shunting the terminals of the alternating current supply connected to the primary 35 of the Tesla transformer. The main electrodes 24 and 25 have the form of elongated cylinders with hemispherical front faces. The auxiliary electrode 30 is ball-shaped and is arranged in the proximity of the rear portion of the electrode 24.

The operation of this device is as follows:

The potential of the auxiliary electrode 30 is substantially the same as that to which condenser 32 is loaded, because condenser 31 has a relatively small capacity of about a few hundred centimetres and is shunted by the resistance 33. The rotary spark gap 36 is driven in synchronism with the frequency of the alternating current supply connected to the primary 20 of the main transformer. The timing of the ignition of the rotary spark gap with respect to the phase of the alternating voltage may be varied by suitably adjusting the rotary portion of the spark gap 36. When a flash-over occurs in the rotary spark gap 36, an oscillating circuit is formed by the condenser 37 and the primary 35 of the Tesla transformer, the latter being energized so that a high voltage is produced in the secondary 34 and imparted to both the condenser 32 and the auxiliary electrode 30. In consequence thereof a flash-over is initiated between auxiliary electrode 30 and main electrode 24. Hereby a voltage shock is imparted to the main electrode 24 initiating a flash-over between the main electrodes 24 and 25, so that an arc discharge is formed between them, the current of which is fed by the main transformer 20, 21. The voltage and the polarity of the igniting oscillations should be controlled in such manner that the voltage difference between the main electrodes 24 and 25 is sufficiently high, when a flash-over occurs between the auxiliary electrode 30 and the main electrode 24. Means should be provided for quickly extinguishing the flash-over between the auxiliary electrode 30 and the main electrode 24, so that the main current cannot flow through the auxiliary spark gap to ground. Additional means for preventing this are constituted by the condenser 31 limiting the current in such manner, that no arc can be maintained between auxiliary electrode 30 and main electrode 24. Condenser 31 is discharged after every ignition by means of the high resistance 19, the value of which is so high that the current flowing through it is very small. Condenser 31 and resistance 33 connected in parallel constitute an example of a device referred to hereabove for preventing the transition of the main current to the igniting device. If desired, condenser 31 and resistance 33 may be replaced by inductances, rotary spark gaps or the like.

Preferably the shock voltage imparted to the main electrode 24 has a very steep front in order to initiate a flash-over between the main electrodes, before an appreciable current flows from the main electrode 24 to the transformer. The rising velocity of this current in the direction towards the transformer is reduced by the choke 23. Condenser 28 prevents the shock voltage from being transmitted to transformer 20, 21. Similarly a choke 26 and condenser 29 are provided between the other main electrode 25 and the D. C. line, as shown in Fig. 2. The chokes 23 and 26 need not have a high inductivity. They must not have a high capacity of turns, because otherwise when the igniting voltage occurs a large capacity current would flow through them.

In order to render the voltage-rise at the electrode 24 very steep, the electric field between the auxiliary electrode 30 and the main electrode 24 should be homogenized as far as possible so that no discharges occur between these electrodes before the flash-over. In order to render the voltage-rise steep, the auxiliary spark gap may be arranged in oil or compressed air.

In some cases the condensers 28 and 29 may be omitted, this being indicated in Fig. 2 by showing their connections in dotted lines.

It should be understood that the auxiliary electrode 30 may be arranged in proximity of electrode 25 instead of electrode 24.

Referring now to Fig. 3, in which corresponding parts are marked with the same reference numerals as in Fig. 2, two auxiliary electrodes 30 and 30' are arranged in proximity of the rear portion of the main electrodes 24 and 25, respectively. The operation of this device is substantially the same as of that shown in Fig. 2. The primary 35 and the secondary 34 of the Tesla transformer are grounded at their mid-points, so that the auxiliary electrodes 30 and 30' are loaded with opposite potentials with respect to ground. Owing to the flash-overs from the auxiliary electrodes to the main electrodes a very high voltage difference is imparted to the latter. In some cases the grounding of the mid-points of the windings 34 and 35 may be omitted or another controlling potential may be used. If the operating voltage is high, another point of the Tesla transformer may advantageously be grounded. The arrangement shown in Fig. 3 involves the advantage that the igniting circuit is short-circuited at the flash-over between the main electrodes. The energy existing in the igniting circuit is transformed into heat in this circuit, so that it cannot produce high voltages in other parts of the plant.

In order to reduce as far as possible the energy to be produced in the igniting circuit, the main electrodes and the members directly electrically connected to them should be shaped and arranged so as to have a small capacity against ground. If the energy produced in the igniting circuit is low, the other parts of the plant can be easily protected against the high igniting voltages.

In order to produce the igniting voltages other connections may be used instead of the circuits shown in Figs. 1–3, for instance connections used in igniting devices for internal combustion engines of motor cars or the like.

In the arrangements shown in Figs. 2 and 3 the auxiliary electrodes are spaced from the gap in which the main arc is burning, so that the traveling of the arc and the back ignitions are not influenced by the auxiliary electrodes. Further only weak sparks are produced between the auxiliary electrodes and the main electrodes which do not bring about a strong burning away.

In Figs. 4 to 7 some specially shaped main and auxiliary electrodes are shown, in which the distance between the auxiliary electrode and the associated main electrode is very small so that the energy required for igniting the auxiliary arc is very low. In order to ignite the main arc by means of the auxiliary arc, the latter is driven from the auxiliary electrode to the other main electrode by a jet of gas which may be replaced, if desired, by a magnetic blow. In Figs. 4 to 7 only a single auxiliary electrode is shown in connection with a couple of main electrodes. It should, however, be understood that, if desired, two or more auxiliary electrodes may be provided, for instance one auxiliary electrode in connection with each main electrode.

Figure 4:
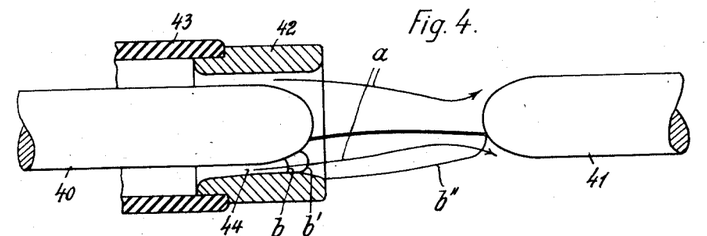
Fig. 4 is a side elevation, partly in section, of a couple of main electrodes and an auxiliary electrode.

Referring now to Fig. 4, 40 and 41 are main electrodes shaped as cylinders with hemispherical front portions, which are supposed to be connected to an alternating current supply (not shown) in a similar manner as shown in connection with Figs. 2 and 3. 42 is an annular auxiliary electrode surrounding the front portion of the main electrode 40 and supported by an annular insulated member 43. The auxiliary electrode 42 is connected to a circuit (not shown) similar to those shown in Figs. 1 to 3 for producing a shock voltage. The auxiliary electrode 42 is arranged coaxially to the associated main electrode 40, so that an annular space 44 of uniform width is formed between them, through which compressed gas or the like may be blown by means of a well known device (not shown). In consequence thereof an annular jet of gas of uniform width and velocity is produced in the direction of the arrows $a$.

The operation of this device is as follows:

An alternating voltage is applied to the main electrodes 40 and 41 and a shock voltage is imparted to the auxiliary electrode 42 in a similar manner as described in connection with Figs. 1 to 3. In consequence thereof an auxiliary arc $b$ will be ignited periodically between the auxiliary electrode 42 and the main electrode 40. This arc is lengthened by the effect of the jet $a$ of compressed gas so that the arc gradually assumes the forms $b'$ and $b''$. When the auxiliary arc has assumed the form $b''$, its outer portion contacts the other main electrode 41. The upper portion of the auxiliary arc now starts a discharge between the main electrodes 40 and 41, which changes into the main arc between the main electrodes, which is maintained by the alternating voltage existing between the main electrodes 40 and 41.

In order to secure an effective operation of this device, means should be provided for preventing the auxiliary arc from escaping or expanding to a greater extent than necessary for initiating the main arc. To this end the main electrodes and particularly the other main electrode 41 should be shaped in such manner that the striking of the flow of gas against this electrode does not produce stoppage or whirls of the gas. This applies particularly to the case in which the electrodes are arranged in a closed chamber and a flow of gas for cooling the main arc is produced.

Figure 5:
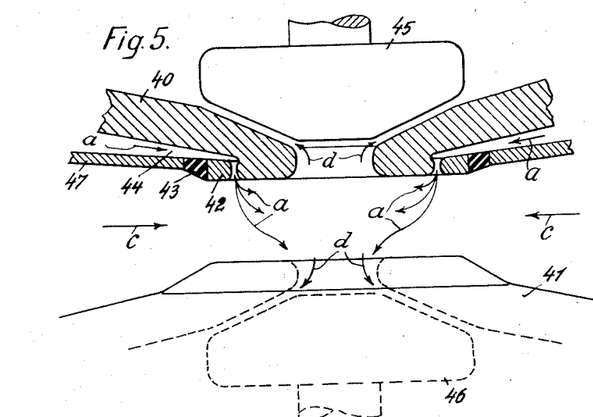
Fig. 5 is a similar illustration of another couple of main electrodes and an auxiliary electrode.
Figure 6:
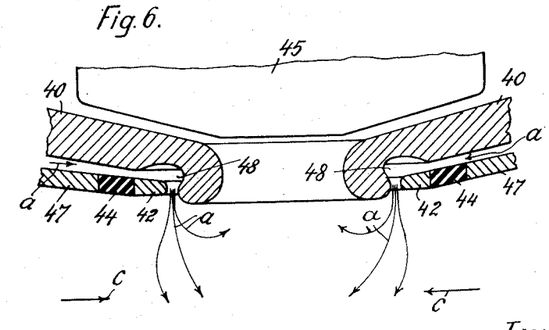
Figs. 6 and 7 are illustrations similar to Fig. 5 showing further modifications.
Figure 7:
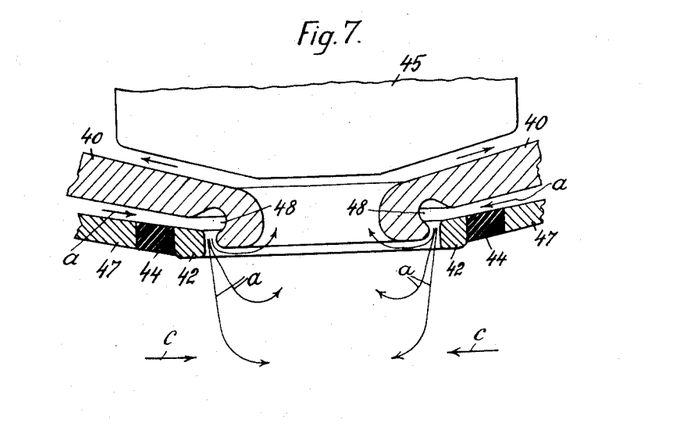

In such cases the device shown in Fig. 4 may be modified in the manner illustrated in Figs. 5, 6 and 7.

Referring now to Fig. 5, the main electrodes 40 and 41 are formed as hollow cones provided with central top openings. In the electrodes conical members 45 and 46 respectively are arranged so that a conical annular space is formed between each main electrode and its associated member. The annular auxiliary electrode 42 is supported by an insulating member 43 secured to a metal member 47 in such manner that an annular space 44 is formed between the main electrode 40, the members 47 and 43 and the auxiliary electrode 42. All these parts may be enclosed in a chamber (not shown).

The operation of this device is as follows:

An auxiliary arc is established between the auxiliary electrode 42 and the main electrode 40 in the manner described hereabove. Compressed gas is caused to flow through the annular space 44 in the direction of the arrows $a$, lengthening the auxiliary arc and driving it into contact with the other main electrode 41, so that the main arc is established. In order to cool and extinguish the main arc, a flow of gas is established in the direction of the arrows $c$, this gas escaping together with the gas forming the driving jet in the direction of the arrows $d$ through the conical spaces formed between the main electrodes 40, 41 and the conical members 45, 46.

It is important that the auxiliary flow of gas $a$ and the main flow of gas $c$ do not disturb each other. In order to accomplish this, the nozzle opening between the auxiliary electrode and its associated main electrode may be suitably formed and the flow of gas may be suitably guided. For instance the front faces of the auxiliary electrode 42 and the main electrode 40 may be arranged in different planes, as shown in Figs. 6 and 7. In Fig. 6 the front face of the main electrode 40 projects over the auxiliary electrode 42, while in Fig. 7 the auxiliary electrode 42 projects over the front face of the main electrode 40. Further in both Figs. 6 and 7 the main electrode 40 is formed at its outer circumference near the nozzle opening with a recess 48 forming a gas collecting chamber. Whether the arrangement shown in Fig. 6 or that shown in Fig. 7 should be used, depends on the operating voltage and current of the valve on which depends the distance between the electrodes and the strength of the main flow of gas $c$.

If desired, the circular nozzle openings for the auxiliary gas jet formed by the main electrode 40 and the auxiliary electrode 42 shown in Figs. 5 to 7 may be replaced by nozzles of some other kind. For instance one or more nozzles may be secured to the main electrode, said nozzles being directed towards the other main electrode, the auxiliary electrodes being arranged in the proximity of the nozzle openings. If a plurality of nozzles are provided, means may be provided for initiating an auxiliary arc alternating near each nozzle opening.

As will be seen from Fig. 5, the flows of gas are directed in such manner, that the auxiliary arc strikes the main electrode 41 near its nozzle-shaped central opening, while the base point of the auxiliary arc at the main electrode 40 is enabled to travel to the edge of the central opening of this electrode without being troubled by the auxiliary jet of gas.

The velocity of the auxiliary gas jet driving the auxiliary arc towards the opposite main electrode should be chosen so high that variations of the velocity with which the auxiliary arc is driven by the gas jet, do not materially change the timing of the ignition of the main arc.

The voltage in the auxiliary circuit, of which the auxiliary arc forms part, should be chosen so high that the auxiliary arc will not be extinguished even by an auxiliary gas jet having a high velocity. In order to stabilize the auxiliary arc, ohmic or inductive resistances may be inserted in the auxiliary circuit. The voltage for the auxiliary circuit may be derived from the main transformer by means of tappings of the secondary thereof. If desired, intermediate transformers may be provided. If necessary separate current supplies insulated from ground may be provided for one or more auxiliary circuits. In polyphase converting systems the auxiliary circuit may be arranged on the direct current side, so that a common current supply may be used for the auxiliary circuits of a plurality of phases.

In the embodiments described above the igniting and maintaining of the auxiliary arc is effected by means of a single current supply. In some cases however separate current supplies are preferably used for igniting and maintaining the auxiliary arc, because for the ignition of the arc a higher voltage is required than for maintaining it. An arrangement of this kind is shown in Fig. 8, in which, as in Figs. 2 and 3, 20, 21 are the primary and secondary of the main transformer, 24 and 25 the main electrodes, 30 the auxiliary electrode (indicated purely diagrammatically), 27 the connection of the electrode 25 to ground, in which a load indicated by the resistance 50 is inserted. The current for maintaining the auxiliary arc is fed by a transformer having a primary 51 connected to an alternating current supply, and a secondary 52 connected in the circuit containing a resistance 53, the auxiliary electrode 30 and the main electrode 24 in series. The shock voltage for igniting the auxiliary arc is fed by a device similar to that used in connection with igniting devices for internal combustion engines and comprising a primary circuit consisting of a direct current supply 54, a rotary switch 55 and a transformer primary 56. 57 is a transformer secondary connected to the auxiliary electrode 30 through a condenser 58 and a spark gap 59. 60 is a connection connecting the main electrode 24 to one terminal of the transformer windings 56 and 57, respectively.

The operation of this device is as follows:

Transformer 51, 52 permanently maintains an alternating voltage between the auxiliary electrode 30 and the main electrode 24, this voltage, however, being not sufficient for initiating an auxiliary arc. To this voltage a shock voltage is periodically superposed by means of the shock connection 54 to 59, the superposed voltages causing the ignition of the auxiliary arc which is afterwards maintained for a predetermined period of time by means of the energy fed by the transformer 51, 52. The auxiliary arc causes the ignition of the main arc in the same manner as described with reference to the preceding figures.

Preferably the mutual capacity between the electrodes, between which a spark-over is initiated, for instance of the auxiliary electrodes and their associated main electrodes or of the main electrodes shown in Figs. 1-3 is made small in order to facilitate the spark-over.

If the voltage between the main electrodes is sufficiently high at the moment of ignition, the main arc will be ignited when the auxiliary arc is driven between the main electrodes. In polyphase systems, however, the voltage between the main electrodes of a valve may be relatively low and in order to secure ignition of the main arc, the following expedients may be used:

The polarity of the auxiliary electrode should be chosen in such manner that the base point of the auxiliary arc easily changes over from the auxiliary electrode to the opposite main electrode. This will be the case if the base point constitutes the anode. Further a voltage difference should exist between the portion of the auxiliary arc striking the opposite main electrode and this electrode, which is sufficient to produce the required voltage drop, for instance the anode drop. The auxiliary arc should further be extinguished as soon as possible after the igniting of the main arc in order to avoid disturbances of the flow of gas by the heat produced by the auxiliary arc, and to diminish the burning away of the auxiliary electrode. This may be accomplished for instance by suitably choosing the direction of the currents in the main and auxiliary circuits.

If the burning away of the main electrodes is reduced by means of magnetic blow, this latter may be used for influencing the auxiliary arc and for imparting a rotating movement to the base point of the latter on the auxiliary electrode, so that the burning away of the latter is reduced also. Such a magnetic blow can be provided for instance by making the member 47 shown in Fig. 5 from iron and suitably magnetizing it. Since the member 47 surrounds not only the main electrode 40 but also the auxiliary electrode 42, it influences the auxiliary arc in the manner described.

If the igniting and maintaining of the auxiliary arc is effected by means of a single current supply as shown in Figs. 1-3, preferably even if the electrodes are formed as shown in Figs. 4-7, the voltage characteristic of the voltage supply has a very distorted shape, having for instance a steep rise or being formed as a wave, one half of which is steep and has a high peak value, the other half being flat and having a low peak value. In order to obtain a characteristic of this kind, high saturated transformers or choke coils or transformers having a D. C. premagnetization may be inserted in the auxiliary circuit.

If in polyphase converting systems the auxiliary arcs of the single valves are fed from a common current supply by means of a distributor, the frequency and the phase of this current supply may be so chosen that at the moment of ignition a voltage sufficiently high for ignition is delivered to the auxiliary arc. If the frequency is zero, i. e. if a direct current supply is used for feeding the current of the auxiliary arc this will be always the case. In order to change the timing of the ignition, the phases of the distributor and of the auxiliary current supply should be shifted simultaneously.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a converting system of the kind described in combination, two cold main electrodes, means for continuously maintaining a flow of gas in the gap between said main electrodes, means for periodically initiating an arc between said cold main electrodes, and a cold auxiliary electrode arranged at equal distances from said main electrodes for causing simultaneous spark-overs between said auxiliary electrode and said main electrodes for facilitating the ignition of the arc between said main electrodes.

2. In a converting system of the kind described in combination, two main electrodes, means for continuously maintaining a flow of gas in the gap between said main electrodes, means for periodically initiating an arc between said main electrodes, and two auxiliary electrodes, each arranged in proximity of one of said main electrodes, respectively, causing spark-overs between each auxiliary electrode and its coordinated main electrode for facilitating the ignition of the arc between said main electrodes.

3. In a converting system of the kind described in combination, two electrodes, means for continuously maintaining a flow of gas in the gap between said electrodes, means for periodically initiating an arc between said electrodes and means associated with said electrodes for periodically igniting an auxiliary arc and means for moving it between said electrodes.

4. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes and means associated with said auxiliary electrode for periodically igniting an auxiliary arc between said auxiliary electrode and the adjoining main electrode and means for moving the arc between said main electrodes.

5. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a jet of gas for driving the auxiliary arc between said main electrodes.

6. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a magnetic field for driving the auxiliary arc between said main electrodes.

7. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode, and means for producing a jet of gas for driving the auxiliary arc between said main electrodes, said means for producing said flow and said jet of gas being so arranged with respect to each other as to avoid disturbances of said flow by said jet.

8. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for blowing a jet of gas between said auxiliary electrode and the adjoining main electrode for driving the auxiliary arc between said main electrodes.

9. In a converting system of the kind described in combination, two main electrodes, means for continuously maintaining a flow of gas in the gap between said main electrodes, means for periodically initiating an arc between said main electrodes, two auxiliary electrodes, each arranged in proximity of one of said main electrodes, means for periodically igniting auxiliary arcs between each auxiliary electrode and its associated main electrode and means for blowing a jet of gas between said auxiliary electrodes for driving the auxiliary arcs between said main electrodes.

10. In a converting system of the kind described in combination, two main electrodes, means for continuously maintaining a flow of gas in the gap between said main electrodes, means for periodically initiating an arc between said main electrodes, an annular auxiliary electrode arranged coaxially to and surrounding one of said main electrodes and means for causing spark-overs between said auxiliary electrode and the adjoining main electrode.

11. In a converting system of the kind described in combination, two main electrodes, means for continuously maintaining a flow of gas in the gap between said main electrodes, means for periodically initiating an arc between said main electrodes, two annular auxiliary electrodes, each being arranged coaxially to and surrounding one of said main electrodes, and means for causing spark-overs between each auxiliary electrode and its associated main electrode.

12. In a converting system of the kind described in combination, two main electrodes, means for continuously maintaining a flow of gas in the gap between said main electrodes, means for periodically initiating an arc between said main electrodes, an annular auxiliary electrode arranged coaxially to and surrounding one of said main electrodes, means for periodically igniting an auxiliary arc between said auxiliary electrode and the adjoining main electrode and means for driving the auxiliary arc between said main electrodes.

13. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode, means for producing a jet of gas for driving the auxiliary arc between said main electrodes and means for preventing the auxiliary arc from evading the jet of gas by changing its shape.

14. In a converting system of the kind described in combination, two main electrodes, means for continuously maintaining a flow of gas in the gap between said main electrodes, means for periodically initiating an arc between said main electrodes, an annular auxiliary electrode arranged coaxially to and surrounding one of said main electrodes, means for periodically igniting an auxiliary arc between said auxiliary electrode and the adjoining main electrode and means for causing a hollow cylindrical jet of gas to flow with high velocity from the space between said auxiliary electrode and the adjoining main electrode to the other main electrode.

15. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and a nozzle containing an inner pin electrode arranged to blow a jet of gas into the space between said main electrodes.

16. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a jet of gas for driving the auxiliary arc between said main electrodes, the other main electrode being shaped so as to prevent stopping and whirling of the gas.

17. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a jet of gas for driving the auxiliary arc between said main electrodes at so high a velocity of flow that variations of the velocity with which the auxiliary arc is driven by the jet of gas do not substantially change the timing of the ignition of the arc between said main electrodes.

18. In a converting system of the kind described in combination, two main electrodes, means for continuously maintaining a flow of gas in the gap between said main electrodes, means for periodically initiating an arc between said main electrodes, an annular auxiliary electrode arranged coaxially to and surrounding one of said main electrodes, means for causing spark-overs between said auxiliary electrode and the adjoining main electrode, a nozzle formed by said auxiliary electrode and the adjoining main electrode and means for blowing a jet of gas through said nozzle into the space between said main electrodes.

19. In a converting system of the kind described in combination, two main electrodes, means for continuously maintaining a flow of gas in the gap between said main electrodes, means for periodically initiating an arc between said main electrodes, an annular auxiliary electrode arranged coaxially to and surrounding one of said main electrodes, the front faces of said auxiliary electrode and the adjoining main electrode being arranged in different planes, means for causing spark-overs between said auxiliary electrode and the adjoining main electrode, a nozzle formed by said auxiliary electrode and the adjoining main electrode and means for blowing a jet of gas through said nozzle into the space between said main electrodes.

20. In a converting system of the kind described in combination, two nozzle-shaped main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adoining main electrode, and means for producing a jet of gas for driving the auxiliary arc between said main electrodes, the ratio of the velocities of the gas flow and the gas jet being so chosen that the auxiliary arc strikes the other main electrode near its nozzle opening and the base point of the arc of said first-mentioned main electrode is not prevented from traveling to the nozzle opening of this electrode.

21. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a jet of gas for driving the auxiliary arc between said main electrodes and for cooling and extinguishing the arc between said main electrodes.

22. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means associated with said auxiliary electrode for periodically igniting an auxiliary arc between said auxiliary electrode and the adjoining main electrode and driving the auxiliary arc between said main electrodes, and means for quickly extinguishing the auxiliary arc after an arc has been formed between said main electrodes.

23. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means associated with said auxiliary electrode for periodically igniting an auxiliary arc between said auxiliary electrode and the adjoining main electrode and means for quickly driving the auxiliary arc away from said auxiliary electrode.

24. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means associated with said auxiliary electrode for periodically igniting an auxiliary arc between said auxiliary electrode and the adjoining main electrode, and means for extinguishing the portion of the auxiliary arc burning between said auxiliary electrode and this main electrode by means of the arc formed between said main electrodes.

25. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means associated with said auxiliary electrode for periodically igniting an auxiliary arc between said auxiliary electrode and the adjoining main electrode, and magnetic means for extinguishing both the auxiliary arc and the arc formed between said main electrodes.

26. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for periodically igniting an auxiliary arc between said auxiliary electrode and the adjoining main electrode and means for producing a jet of gas for driving the auxiliary arc between said main electrodes, the voltage imparted to the means for igniting the auxiliary arc being chosen so high that the auxiliary arc is not extinguished by said flow of gas.

27. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for igniting an auxiliary arc between said auxiliary electrode and the adjoining main electrode and means for imparting to said auxiliary electrode, when no arc exists between said main electrodes, a potential by which the flash-over potential of said main electrodes is increased.

28. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, a current supply for igniting an auxiliary arc between said auxiliary electrode and the adjoining main electrode and a separate current supply for maintaining the auxiliary arc for a predetermined time after the ignition thereof.

29. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for igniting an auxiliary arc between said auxiliary electrode and the adjoining main electrode and a current supply for the auxiliary arc having a distorted voltage characteristic with a steep rise.

30. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for igniting an auxiliary arc between said auxiliary electrode and the adjoining main electrode and a current supply for the auxiliary arc having a voltage characteristic shaped as a wave having a steep halfwave of high peak value and a flat halfwave of low peak value.

31. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for igniting an auxiliary arc between said auxiliary electrode and the adjoining main electrode and a highly saturated transformer forming a current supply for the auxiliary arc.

32. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes, means for igniting an auxiliary arc between said auxiliary electrode and the adjoining main electrode, a transformer forming a current supply for the auxiliary arc and means for imparting to said transformer a direct current magnetization.

33. In a polyphase converting system of the kind described in combination, a polyphase current supply, two main electrodes in each phase connected to said current supply, means for continuously maintaining a flow of gas in the gap between said main electrodes, an auxiliary electrode in each phase arranged in proximity of one of said main electrodes, an alternating current supply for igniting and maintaining auxiliary arcs between a plurality of said auxiliary electrodes and their associated main electrodes, and means for simultaneously changing the timing of the ignition of the auxiliary arcs and the phase of the current fed by said alternating current supply with respect to the phase of said polyphase current supply.

34. In a converting system of the kind described in combination, two main electrodes, means for continuously maintaining a flow of gas in the gap between said main electrodes, means for periodically initiating an arc between said main electrodes, an auxiliary electrode arranged in proximity of one of said main electrodes and means associated with said auxiliary electrode for periodically igniting an auxiliary arc between said auxiliary electrode and the adjoining main electrode, and means for driving the auxiliary arc between said main electrodes, the polarity of said auxiliary electrode being so chosen as to cause the base point of the auxiliary arc to easily change over from said auxiliary electrode to the other main electrode.

ERWIN MARX.